April 30, 1968    R. E. NATHER    3,381,130
METHOD AND APPARATUS FOR COUNTING STANDARDIZATION
IN SCINTILLATION SPECTROMETRY
Filed Aug. 16, 1965    2 Sheets-Sheet 1
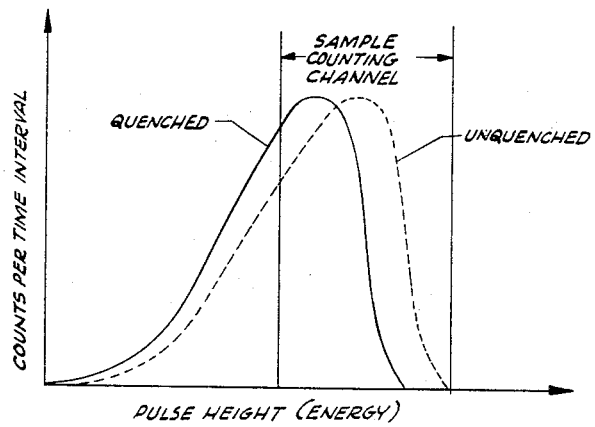
*Fig. 1*
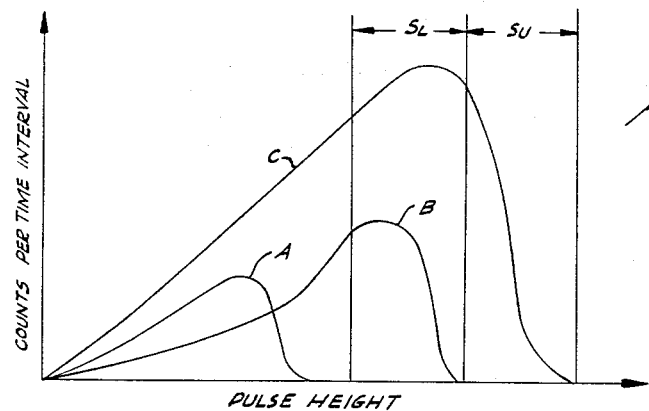
*Fig. 2*
*Fig. 3*
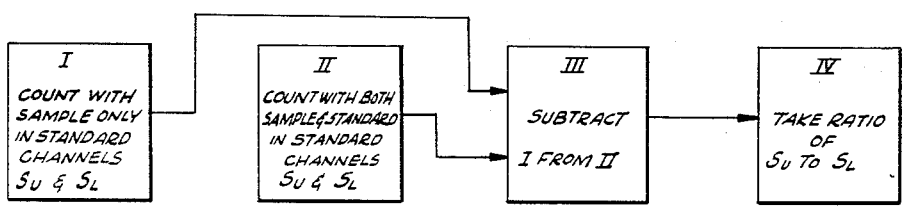
INVENTOR.
ROY E. NATHER
BY Fulwider, Patton, Rieber,
Lee, and Utecht
ATTORNEYS

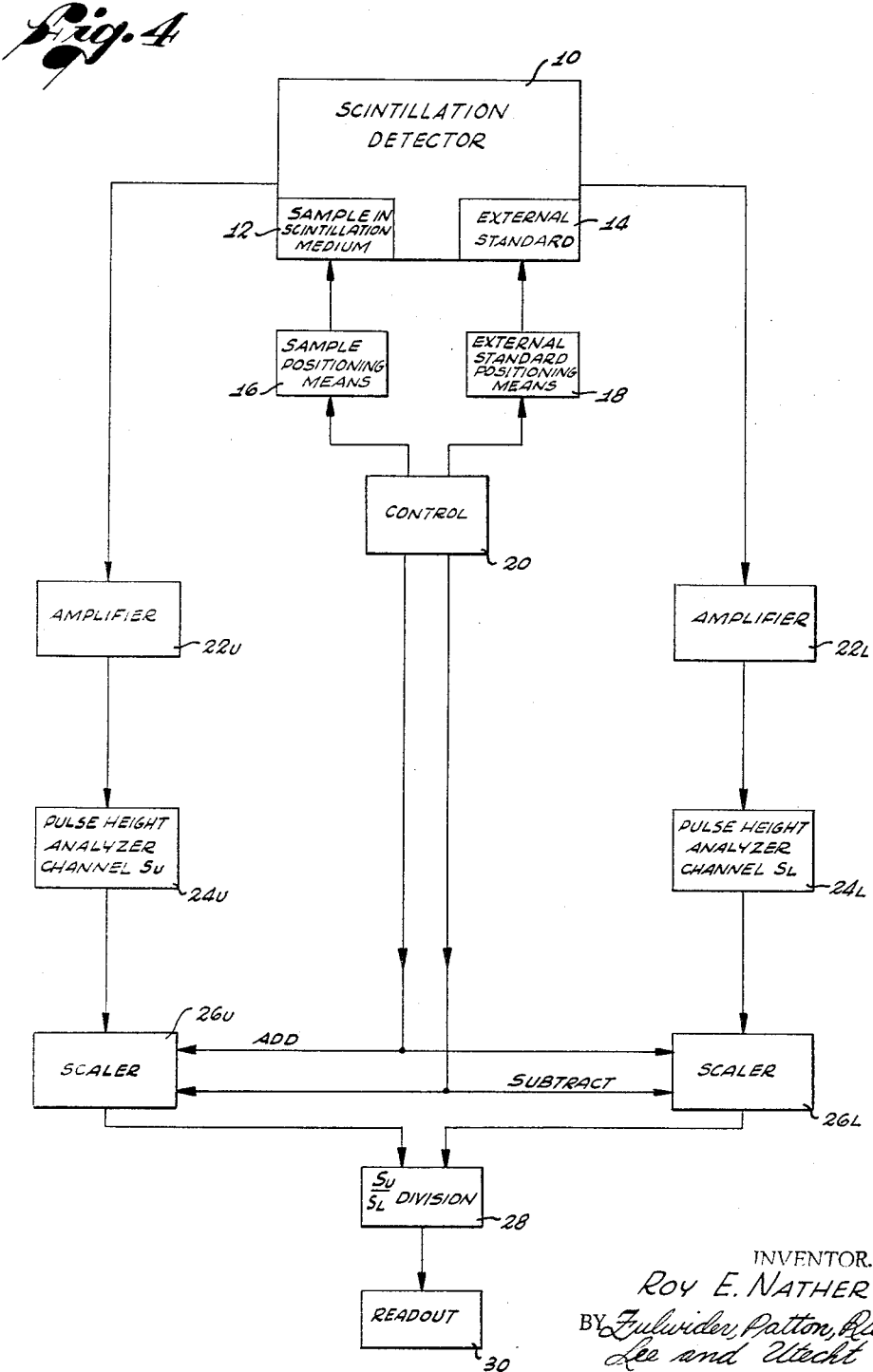

United States Patent Office 3,381,130
Patented Apr. 30, 1968

3,381,130
METHOD AND APPARATUS FOR COUNTING STANDARDIZATION IN SCINTILLATION SPECTROMETRY
Roy E. Nather, Solana Beach, Calif., assignor to Beckman Instruments, Inc., a corporation of California
Filed Aug. 16, 1965, Ser. No. 480,034
11 Claims. (Cl. 250—71.5)

ABSTRACT OF THE DISCLOSURE

An improved method and apparatus for counting standardization in scintillation counting for determining the degree of sample quenching. The net standard count rate is determined in each of two energy windows, defining separate channels, by isolating it from sample and background count rates, and the ratio of the standard rates in the two channels is taken. The apparatus illustrated employs scalers capable of counting in two directions, to count the sample alone in one direction, and the sample plus the standard in the other over equal time to get the standard count rate in each of the two channels which are then divided in a division circuit and read out.

---

This invention relates generally to radiation analysis systems, and more particularly to improvements in methods and means of standardization for determining the degree of sample quenching in scintillation spectrometers.

The scintillaiton process, i.e., the conversion of energy to visible light, was first utilized at the turn of the 20th century for the visual detection of alpha particles. Since that time, advances in scintillation counting techniques and the application of the latter to radiation spectrometry have provided some of the most powerful analytical tools available to the worker in the field of experimental nuclear physcs.

Scintillation counting is based on the reaction of nuclear radiation with scintillation medium which emits photons in response to such radiation. A radioactive sample, which emits the nuclear radiation being detected, is physically arranged so that the emitted radiation impinges upon the scintillation medium, whereby brief pulses of light or scintillations are produced with scintillation intensity levels proportional to the energy of the impinging radiation.

In liquid scintillation spectrometry, a radioactive test sample, e.g. a beta-emitter, is dissolved, suspended, or otherwise mixed in a liquid scintillation medium within a transparent sample vial, thus providing an ideal geometric configuration for the detection of low energy beta particles. The liquid scintillation medium comprises two main components, the solvent which is typically toluene or xylene, and the primary solute or dissolved phosphor. Most of the energy from the nuclear radiation emitted by the sample is absorbed by the solvent and then transferred to the solute, which actually emits the visible light scintillations. The amount of light given off is proportional to the amount of energy absorbed from the radiation. The light flashes or scintillations may be detected by any suitable light sensitive device, such as a photomultiplier or the like, which converts the photon energy of each scintillation to an output voltage pulse having a pulse height or amplitude proportional to the energy of the detected scintillation.

In the usual multichannel spectrum analyzer, the output electrical pulses from the photomultiplier are first amplified and then fed simultaneously as input to a plurality of parallel analyzing and counting channels. Each channel typically includes a pulse height analyzer having discriminators which define a channel "window" extending between upper and lower pulse height limits. Thus, each pulse height analyzer sorts pulses by passing only those pulses which fall within the defined window or acceptable range of pulse heights, all larger and smaller pulses outside the window being rejected from that particular channel. The pulses passes by each pulse height analyzer are then fed to a scaler or other suitable counting and recording device for each individual channel. Since the photomultiplier produces output voltage pulses having pulse heights proportional to the energies of the detected scintillations, it will be apparent that the pulse height spectrum corresponds to the energy spectrum of the nuclear radiation emitted by the test sample.

One of the major problems affecting the accuracy of analysis in liquid scintillation spectrometry is the problem of sample "quenching." The quenching phenomenon is an attenuation effect which reduces the number of photons produced by each scintillation and thus causes the ultimate pulse height spectrum for a given test sample to vary from that which would normally be obtained if there were no quenching.

Many dissolved samples interfere with the light output of the liquid scintillation medium by absorbing excitation energy from the solvent which is then no longer available to produce light. This is referred to in the art as "chemical quenching." Other samples are colored and absorb some of the light emitted by the scintillation medium before it can reach the photomultiplier tube and thus suffer from a form of "color quenching." Both of these quenching effects reduce the number of photons detected by the photomultiplier and, hence, result in an output energy spectrum which is shifted to lower values of pulse height. Thus, the relationship of the energy spectrum with respect to the windows of the various counting and analyzing channels is affected, and the latter in turn affects the counting efficiency in each channel.

In view of the foregoing, it is of major importance in liquid scintillation spectrometry that the output pulse height spectrum be calibrated or corrected for the effects of sample quenching. A number of techniques have been developed to determine the degree of sample quenching present. These methods include: (1) the sample channels ratio method, (2) the internal standard method, and (3) the external standard method.

In the sample channels ratio method, the sample spectrum is divided between two adjacent analyzer channels. Since the effect of quenching, if it exists, is to shift the spectrum to lower apparent energy levels, the ratio of the count in one channel to the count in the other channel will be different for a quenched sample than for the same sample without quenching. Hence, the variation in the channels ratio for the sample is an indication of the degree of quenching present. Unfortunately, however, the sample channels ratio method works well only for high activity samples and is not considered sufficiently accurate for weak samples because of the large counting statistical errors involved in each of the two channels. In addition, the sample channels ratio method is impractical when more than one isotope is present in the sample, since the spectral shift due to quenching is different for each of the isotopes, and the overlap of counting data from the spectra for two samples complicates the relationship between the channels ratio and the degree of quenching.

In the internal standard method, the sample is re-counted after adding a known quantity of a radioactive standard to the sample vial. The apparent reduction in the counts of the internal standard is an indication of the degree of quenching present. The internal standard method is a slow and difficult procedure, since the sample vial must be opened and a carefully measured quantity of radioactive standard must be pipetted into each sample vial before recounting. Such an operation is also dangerous from the standpoint of handling by personnel. Moreover, if the sample is highly active the standardization process suffers from statistical inaccuracy since both the sample and the standard are counted together and the net standard count rate is then calculated as a relatively small difference between two much larger numbers. Furthermore, the internal standard method is a destructive method in that the sample count cannot again be measured after the standard has been added.

The external standard method provides some improvements over the aforesdescribed internal standard and sample channels ratio methods. In the external standard method, the sample is first counted alone and then the standard, which is a high intensity gamma source, is mechanically moved from its normally shielded position to a position adjacent the test sample vial. The Compton electron spectrum arising within the test sample vial due to gamma ray bombardments from the standard produces scintillation pulses due to interaction with the Compton electrons, such Compton electrons being quenched in essentially the same way as the beta particles emitted by the test sample. Counting is carried out for the standard in a separate channel having a lower level discriminator cutoff which is above the highest energy of any sample spectra. Hence, only counts due to the external standard alone are recorded and, therefore, the degree of quenching is immediately apparent by comparing the quenched count with a known unquenched count.

The external standard method of quench calibration has the advantages of being independent of sample activity level, of being independent of the number of isotopes present in the test sample, and of providing a quench correction which is independent of the type of quenching present. Moreover, the standard gamma source can be made strong enough so that very short counting times are required to determine the degree of quenching. Unfortunately, however, the external standard method suffers from the drawback that sample response to the standard depends not only on sample quenching but also upon the sample volume and sample vial thickness. In addition, the response is critically sensitive to the position of the external standard with respect to the sample vial.

The aforedescribed quench calibration methods are described in U.S. Patent No. 3,188,468, entitled Method and Apparatus for Automatic Standardization in Liquid Scintillation Spectrometry. While each of these quench calibration methods has proven satisfactory for particular applications, all of these methods suffer from one or more of the aforedescribed deficiences regarding dependence upon sample activity level, sensitivity to sample volume, vial thickness, and source-to-sample geometry, inaccuracy due to the presence of a plurality of different isotopes in the same sample, or alteration of the sample so that it cannot be used again. Hence, those concerned with the development of scintillation spectrometers have long appreciated the need for improved quench calibration techniques and equipment.

Accordingly, it is a primary object of the present invention to provide a new and improved method and means of quench calibration which overcomes the above and other disadvantages of the prior art.

Another object is to provide a new and improved method and means of quench calibration which is non-destructive of the test sample.

A further object of this invention is the provision of a new and improved method and means of quench calibration which is independent of the number of isotopes present in the test sample.

Still another object is to provide a new and improved method and means of quench calibration which is independent of the test sample activity level and provides accurate standardization for relatively weak samples.

Yet another object of this invention is the provision of a new and improved method and means of quench calibration which is insensitive to sample volume, sample geometry, and source to sample spacing.

A still further object is to provide a new and improved method and means of quench calibration which does not present a hazard to operating personnel.

The above and other objects and advantages of the present invention will become apparent from the following detailed description, when taken in conjunction with the accompanying drawings of illustrative embodiments thereof, and wherein:

FIGURE 1 is a graphical representation of quenched and unquenched energy spectra for a radioactive test sample;

FIGURE 2 is a graphical representation of pulse height spectra for a pair of sample isotopes and an external standard;

FIGURE 3 is a schematic flow diagram of the quench calibration method in accordance with the present invention; and FIGURE 4 is a block diagram schematic of a scintillation spectrometry system embodying the present invention.

Referring now to the drawings, FIGURE 1 illustrates the effcet of the quenching phenomenon upon the pulse height spectrum for a particular radioactive test sample. The curve shown in phantom indicates the spectrum which would be obtained if no quenching occured. Since the degree of quenching is not known prior to counting the test sample, the sample counting channel is located so that the peak of the unquenched curve appears substantially at the center of the counting channel. This maximizes the area under the unquenched curve falling within the window defined by the upper and lower channel discriminator levels and thereby maximizes counting efficiency.

As illustrated by the solid line "quenched" curve in FIGURE 1, quenching causes the sample spectrum to shift to lower apparent energy levels. Hence, the sample spectrum is no longer positioned properly with respect to the sample counting channel, and counting efficiency is decreased substantially. It is therefore necessary to determine the degree of quenching so that the count rate of the quenched sample can be corrected to the unquenched value. Once the degree of quenching is known, the counting efficiency can be determined from calibration curves by techniques well known in the spectrometry art.

The method of quench calibration in accordance with the present invention will become apparent from observation of FIGURES 2 and 3. Curves A and B in FIG-2 represent the spectra for two different test samples or a pair of isotopes present in a single test sample. Curve C represents the spectrum for a highly active external gamma standard such as cesium-137 which can be selectively positioned adjacent to a sample containing vial by external standard positioning means well known in the art.

When the gamma standard is positioned adjacent the sample vial, the count rate due to the Compton electrons produced by interaction of the sample with emitted gammas is measured in two separate data channels $S_U$ and $S_L$. The count rate in the upper standard channel $S_U$ is divided by the count rate in the lower standard channel $S_L$, and this ratio is indicative of the degree of quenching for the standard and the sample.

It will be apparent in FIGURE 2 that there is no counting contribution to the counting channels for the standard channels $S_L$ or $S_U$ from the spectrum A. However, the spectrum B does make a counting contribution to the counting channels for the standard. Therefore, the sample contribution must be subtracted from the combined counting rate for the standard plus the sample before taking the channels ratio.

FIGURE 3 illustrates the method steps involved in practicing the external standard-channels ratio standardization technique of the present invention. In step I, a count rate is taken in both the upper and lower standard channels $S_U$ and $S_L$ for the sample only.

In step II, count rates are again taken in the standard channels $S_U$ and $S_L$ for the combined effect of both the sample and the external standard, i.e., with the external standard positioned adjacent the test sample vial.

In step III, the results of step I are substracted from the results of step II to determine the net standard count rate due to the external standard alone in both of the standard channels $S_U$ and $S_L$.

In step IV, net count rates due to the standard alone in channels $S_U$ and $S_L$, obtained in step III, are utilized to compute the ratio of the $S_U$ count rate to the $S_L$ count rate. This provides the external standard-channels ratio number which can be displayed or printed out. This ratio number can then be correlated with counting efficiencies by means of calibration curves obtained by varying the degree of quenching with known standards.

By utilizing separate counting channels for the standard, the standard counting channels can be located for optimum counting response for the particular gamma standard employed. Hence, the accuracy of the ratio determination and efficiency correlation is enhanced. For convenience, the relative widths of the standard channels $S_L$ and $S_U$ may be adjusted so that, in the absence of quenching, the ratio of the net standard count rate in channel $S_U$ to the net standard count rate in channel $S_L$ is equal to unity.

The external standard-channels ratio method of quench calibration, in accordance with the present invention, combines the best features of the external standard method (superior performance for weak samples and samples containing a plurality of isotopes) and the sample channels ratio method (which is insensitive to sample volume and system geometry) without suffering from any other of the disadvantages of either of these prior art methods.

Referring now to FIGURE 4, there is shown a liquid scintillation spectrometer adapted to perform the external standard-channels ratio technique for quench determination in accordance with the present invention. The scintillation detector 10 in FIGURE 4 represents any appropriate light sensitive transducer, such as a photomultiplier or the like, capable of detecting and converting light scintillations to output voltage pulses with amplitudes proportional to the photon energy of each scintillation detected.

A sample 12 in a scintillation medium, and an external standard 14 are shown schematically as block inserts within the overall detector system 10. It will be appreciated that both the sample and external standard are each adapted for movement by means well known in the spectrum analyzer art so that they can be selectively moved to detecting and non-detecting positions. In this connection, the sample positioning means and external standard positioning means for the system are indicated schematically by the blocks 16 and 18, respectively. The sample positioning means 16 and external standard positioning means 18 are operated by any appropriate control 20 which may be either automatic or manual.

The control 20 is utilized to perform the sequence of operations for the quench calibration method previously described in connection with FIGURE 3. In this regard, the control 20 first commands the sample positioning means 16 to move the sample 12 adjacent the scintillation detector 10 so that a count can be taken for the sample only in the standard channels $S_U$ and $S_L$. The control 20 then issues a command to the external standard positioning means 18 to move the standard 14 adjacent the sample 12 in the detection chamber so that a count of the same duration can be taken in the standard channels $S_U$ and $S_L$ to measure the combined effect of the sample and the standard. The requirements of steps I and II in the method of FIGURE 3 are thus satisfied.

The pulse output of the scintillation detector 10 is simultaneously fed as a common input to amplifiers $22_U$ and $22_L$ in the parallel analyzer channels $S_U$ and $S_L$, respectively. The amplified outputs from the amplifiers $22_U$ and $22_L$ are then directed in the usual manner through pulse height analyzers $24_U$ and $24_L$ for each channel, and then to appropriate channel scalers $26_U$ and $26_L$, respectively, to record the counts detected and passed through each analyzer channel.

The particular scalers $26_U$ and $26_L$ illustrated in FIGURE 4 are of the type capable of subtraction as well as addition, i.e., they can count backward as well as forward. Hence, during the portion of the quench calibration cycle when a count is being taken for the sample only, the control 20 commands the scalers $26_U$ and $26_L$ to count in the subtract mode.

During the equal portion of the quench calibration cycle when the sample and external standard are being counted together, the control 20 commands the scalers $26_U$ and $26_L$ to count in the add mode. Hence, at the end of both counting cycles, the scalers $26_U$ and $26_L$ indicate a count in each of the two standard channels which is the difference between the count for the combined standard and sample and the count for the sample alone over equal time. The latter is the net count rate due to the external standard alone, and thus provides the results of step III of the quench calibration technique.

Although the invention has been described in connection with the use of add-subtract scalers, the invention is not so limited and it is to be understood that subtraction may be accomplished by any manner known in the art without departing from the invention. For example, instead of counting the sample in the subtract mode, counting of the sample can first be carried out in the add mode with the count subsequently being complemented to effect subtraction.

The outputs of the scalers $26_U$ and $26_L$ representing the net count rates in each of the standard channels $S_U$ and $S_L$ due to the standard alone, are directed to any suitable division network 28, to provide the channels count ratio $S_U/S_L$ as required by step IV of the quench calibration method illustrated in FIGURE 3.

After the ratio $S_U/S_L$ has been computed, it may be read out in any appropriate manner, as indicated schematically by the readout block 30 in FIGURE 4. The external standard-channels ratio number can then be used in the manner previously described, to correlate the ratio number with counting efficiency by means of appropriate calibration curves. The standard count rates in the two channels may be arrived at by counting the sample alone and the sample plus the standard for the same time period as suggested above, by dividing the absolute count for each by accumulated time to derive the rates, by counting either the sample plus standard or the sample alone for a different length of time and adjusting the results for the time difference such as by shifting a decimal point or dividing, or by any other well known means.

The present invention satisfies a long existing need in the scintillation spectrometry art for a new and improved method and means of quench calibration independent of sample activity level, independent of the number of isotopes present in the sample, independent of sample volume, geometry, and source to sample spacing, and which completely eliminates the addition of internal standards so that samples remain unaltered for further use.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A method of quench determination in scintillation spectrometry, comprising the steps of:
determining the decay event rate due to a test sample and a standard in each of two different energy ranges;
isolating the net standard count rate due to said standard alone in each of said two energy ranges;
and determining the ratio of the net standard count rate in one of said two energy ranges to the net standard count rate in the other of said two energy ranges, said ratio being indicative of the degree of quenching present.

2. A method for determining the degree of quenching in a scintillation spectrometry system, comprising the steps of:
counting the decay events due to a test sample alone in two different energy ranges;
counting the total decay events due to the test sample and a standard in said two energy ranges;
subtracting in each of said two energy ranges the count obtained for said test sample alone from the count obtained for said test sample and said standard with an adjustment for any differences in counting time to obtain the net standard count rate in each of said two energy ranges for said standard alone;
and determining the ratio of the net standard count rate in one of said two energy ranges to the net standard count rate in the other of said two energy ranges, said ratio being indicative of the degree of quenching present.

3. A method of quench determination in scintillation spectrometry, comprising the steps of:
counting the decay events during a prescribed time interval due to a radioactive test sample and a standard radioactive source located externally of said sample, said counting being carried out in each of two different energy ranges;
extracting the net standard count rate due to said standard alone in each of said two energy ranges;
and determining the ratio of the net standard count rate in one of said two energy ranges to the net standard count rate in the other of said energy ranges, said ratio being indicative of the degree of quenching present.

4. A method of quench determination in scintillation spectrometry, comprising the steps of:
determining the decay event rates due to a beta-emitting test sample alone in two different energy ranges;
determining the total decay event rates due to the test sample and Compton interactions due to a gamma-emitting standard in said two energy ranges;
compensating the rate obtained with said test sample and said standard combined for any count rate contribution due to said test sample alone in each of said two energy ranges to obtain the net standard count rate in each of said two energy ranges for said standard alone;
and determining the ratio of the net standard count rate in one of said two energy ranges to the net standard count rate in the other of said two energy ranges, said ratio being indicative of the degree of quenching present.

5. A method of quench determination in liquid scintillation spectrometry, comprising the steps of:
counting the decay events due to a beta-emitting test sample alone in each of two different energy ranges;
counting the total decay events due to said test sample and the Compton interaction with said sample due to a gamma-emitting standard located externally of said sample, said counting being carried out in said two energy ranges;
subtracting in each of said two energy ranges the count obtained from said test sample alone from the count obtained from said test sample and said standard with an adjustment for any differences in counting time to obtain the net standard count rate in each of said two energy ranges for said standard alone;
and determining the ratio of the net standard count rate in one of said two energy ranges to the net standard count rate in the other of said two energy ranges, said ratio being indicative of the degree of quenching present.

6. A method of quench determination in scintillation spectrometry, comprising the steps of:
selecting two energy ranges adapted to provide maximum counts for decay events occurring in a radioactive standard;
counting the decay events during a prescribed time interval due to a radioactive test sample and said radioactive standard in each of said two energy ranges;
isolating the net standard count rate due to said standard alone in each of said two energy ranges;
and determining the ratio of the net standard count rate in one of said two energy ranges to the net standard count rate in the other of said two energy ranges, said ratio being indicative of the degree of quenching present.

7. A method of quench determination in liquid scintillation spectrometry, comprising the steps of:
selecting two different energy ranges tailored to the energy spectrum of a gamma-emitting standard to produce substantially maximum count results for decay events caused by said standard;
counting simultaneously in each of said two energy ranges during a prescribed time interval the decay events due to a beta-emitting test sample alone;
positioning said standard adjacent said test sample;
counting simultaneously in each of said two energy ranges the decay events due to said test sample and the Compton interactions in said sample due to said standard;
automatically subtracting in each of said two energy ranges the count obtained for said test sample alone from the count obtained for said test sample and said standard with an adjustment for any differences in counting time to obtain the net standard count rate in each of said two energy ranges for said standard alone;
and determining the ratio of the net standard count rate in one of said two energy ranges to the net standard count rate in the other of said two energy ranges, said ratio being indicative of the degree of quenching present.

8. In a liquid scintillation spectrometer wherein a gamma-emitting standard is adapted to be selectively positioned adjacent to and externally of a transparent vial containing a beta-emitting test sample within a scintillation medium, a method of quench calibration comprising:
measuring the net standard count rate in each of two different energy ranges due solely to the Compton interactions of gamma radiation from said standard with said test sample and scintillation medium;
and determining the ratio of the net standard count rate in one of said two energy ranges to the net standard count rate in the other of said two energy ranges, said ratio being indicative of the degree of quenching present.

9. In a scintillation spectrometry system, the combination comprising:
scintillation detection means for producing output voltage pulses having amplitudes proportional to the energy levels of the scintillations detected;
pulse height analyzing and counting means for each of two different energy channels, said analyzing and counting means receiving as input the output voltage pulses from said detection means;

first positioning means for selectively positioning a radioactive test sample adjacent said detection means;

second positioning means for selectively positioning a radioactive standard adjacent said test sample while said sample is adjacent said detection means;

subtraction means for subtracting in each of said two energy channels the pulse count due to said test sample alone from the pulse count correlated with regard to any differences in counting time for both said sample and said standard to obtain the net standard count rate in each of said two channels due to said standard alone;

and division means responsive to the output of said subtraction means for determining the ratio of the net standard count rate in one of said channels to the net standard count rate in the other of said channels, said ratio being indicative of the degree of quenching present.

10. In a liquid scintillation spectrometer for analyzing beta-emitting test samples in intimate contact with a scintillation medium within a transparent sample vial, the combination comprising:

scintillation detection means for producing output voltage pulses having amplitudes proportional to the energy levels of the scintillations detected;

pulse height analyzing and counting means for each of two different energy channels, said analyzing and counting means receiving as input the output voltage pulses from said detection means;

first positioning means for selectively positioning a sample vial containing said scintillation medium and said beta-emitting test sample adjacent said detection means;

a gamma-emitting standard source;

second positioning means for selectively positioning said standard source adjacent said test sample vial and externally of said vial while said sample vial is adjacent said detection means;

automatic subtraction means for subtracting in each of said two channels the pulse count due to said test sample alone from the pulse count over an equal time produced by both said sample and said standard source to obtain the net standard count rate in each of said two channels for said standard source alone;

and division means responsive to the output of said subtraction means for automatically calculating the ratio of the net standard count rate in one of said channels to the net standard count rate in the other of said channels, said ratio being indicative of the degree of quenching present.

11. A combination as set forth in claim 10, including readout means for indicating the ratio calculated by said division means.

References Cited

UNITED STATES PATENTS 3,188,468   6/1965   Packard _____ 250—71.5

ARCHIE R. BORCHELT, *Primary Examiner.*